United States Patent [19]

Whittington

[11] Patent Number: 5,039,406

[45] Date of Patent: Aug. 13, 1991

[54] OIL FILTER ADAPTER

[76] Inventor: Jerry L. Whittington, 211 Oregon St., Odessa, Tex. 79764

[21] Appl. No.: 606,565

[22] Filed: Oct. 31, 1990

[51] Int. Cl.⁵ .................. B01D 27/10; F01M 1/00
[52] U.S. Cl. .................................. 210/168; 210/249;
210/444; 210/450; 210/DIG. 17; 184/6.24;
123/196 A; 285/317; 411/369; 411/542;
411/544; 277/175
[58] Field of Search ............... 210/168, 249, 444, 450,
210/DIG. 13, DIG. 17; 184/6.24; 123/196 A;
285/317, 318; 411/12, 369, 370, 542, 544, 915;
277/175, 235 B

[56] References Cited

U.S. PATENT DOCUMENTS

| | | | |
|---|---|---|---|
| 1,872,430 | 8/1932 | Ericson | 210/DIG. 17 |
| 4,452,695 | 6/1984 | Schmidt | 210/249 |
| 4,676,206 | 6/1987 | DeGrazia, Jr. | 210/168 |
| 4,752,387 | 6/1988 | Thomas | 123/196 A |

Primary Examiner—W. Gary Jones
Assistant Examiner—Matthew Savage
Attorney, Agent, or Firm—Michael I. Kroll

[57] ABSTRACT

An improved oil filter adapter is provided and consists of a bracket mounted on an engine block of an industrial gas engine. The bracket has an inlet fitting and an outlet fitting with a threaded lower cylindrical mounting portion. The inlet fitting is connected to an inlet hose and the outlet fitting is connected to an outlet hose of the lubrication system of the industrial gas engine. The threaded lower cylindrical mounting portion engages with the threaded aperture in a standard spin-on type motor vehicle oil filter so as to be integrated into the lubrication system of the industrial gas engine.

2 Claims, 2 Drawing Sheets

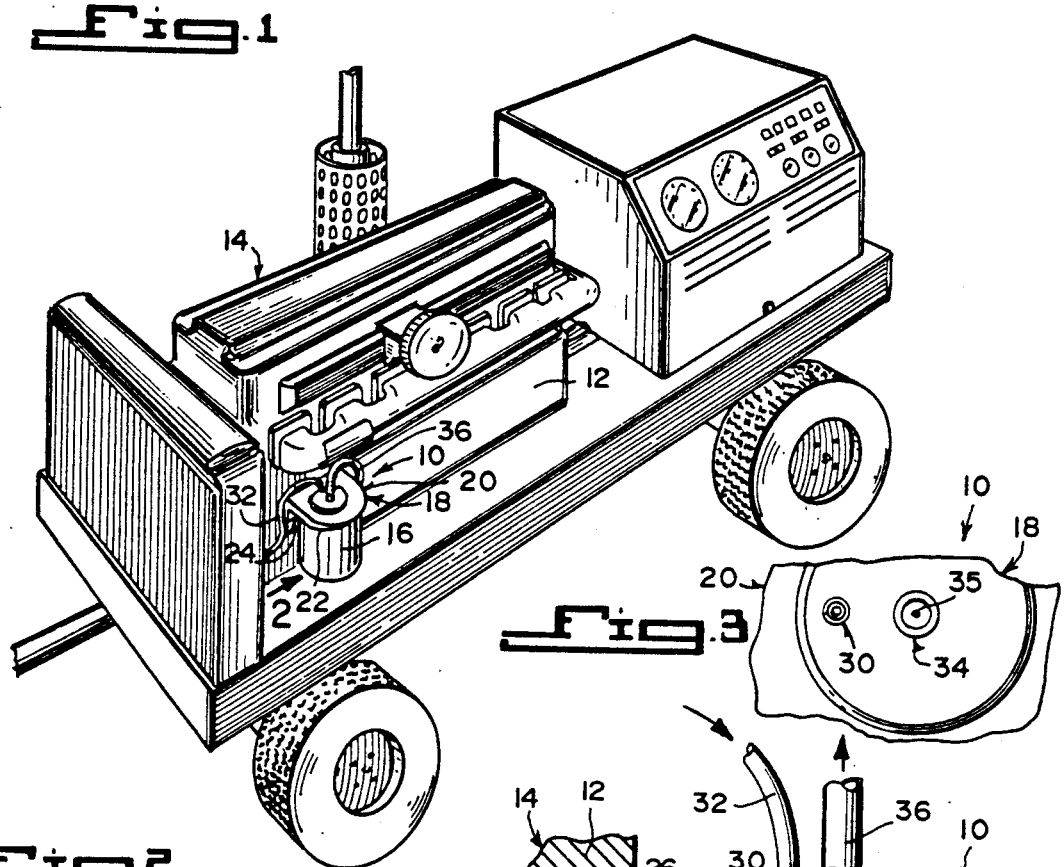
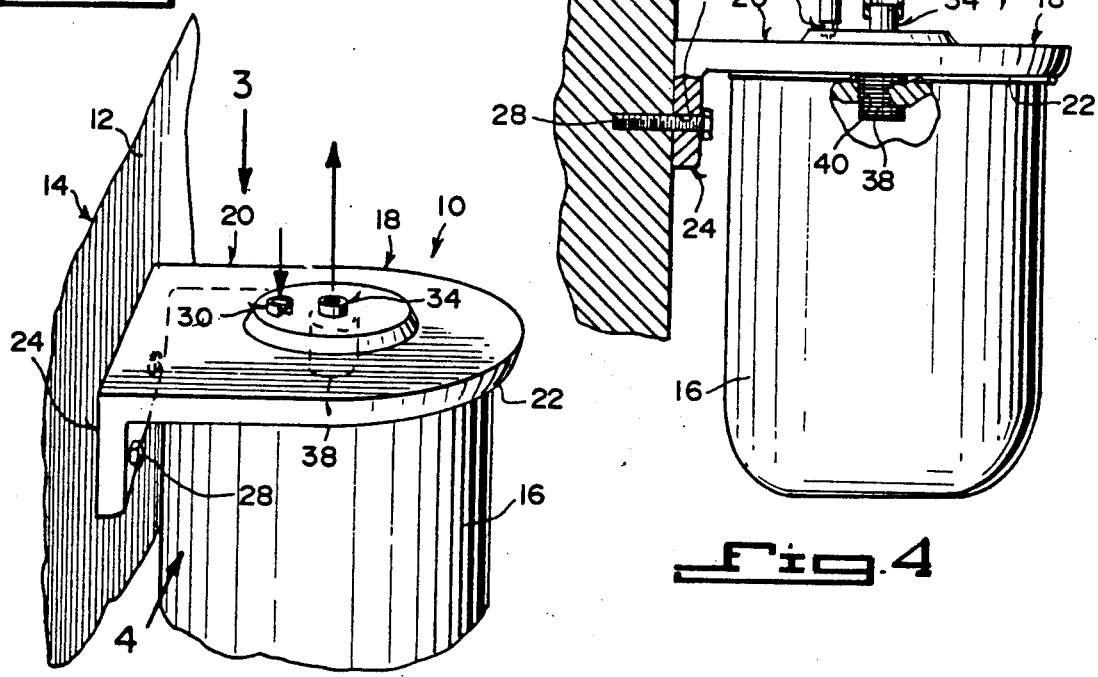

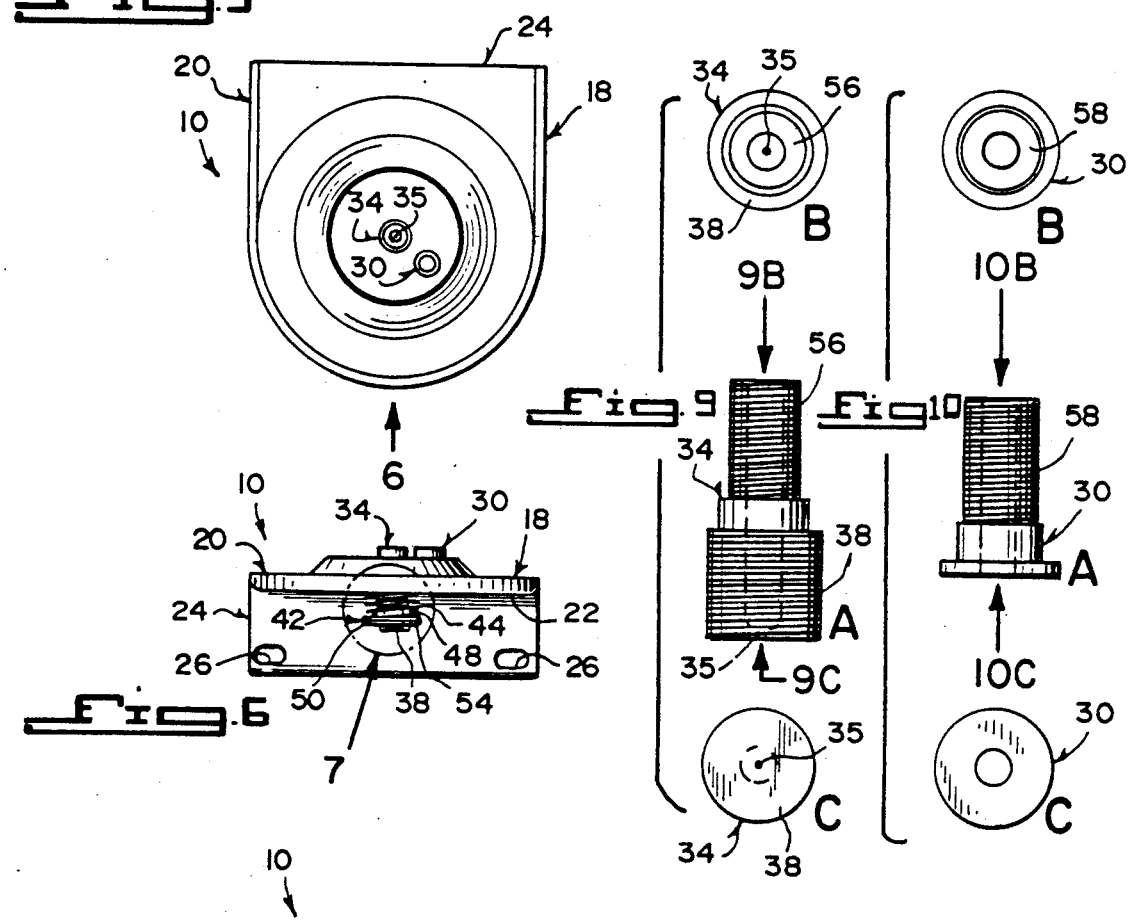
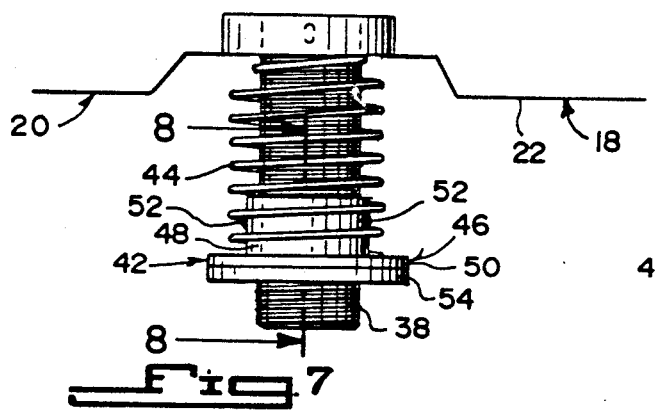

OIL FILTER ADAPTER

BACKGROUND OF THE INVENTION

1. Field of the Invention

The instant invention relates generally to oil filter accessories and more specifically it relates to an improved oil filter adapter.

2. Description of the Prior Art

Numerous oil filter accessories have been provided in prior art that are adapted to help people install and replace oil filters on various types of gas engines. While these units may be suitable for the particular purpose to which they address, they would not be as suitable for the purposes of the present invention as heretofore described.

SUMMARY OF THE INVENTION

A primary object of the present invention is to provide a an improved oil filter adapter that will overcome the shortcomings of the prior art devices.

Another object is to provide an improved oil filter adapter that will allow a person to replace a hard to find industrial oil filter with a standard spin-on motor vehicle oil filter for an industrial gas engine.

An additional object is to provide an improved oil filter adapter that includes a self sealing mounting member fluidly connected to the outlet fitting to prevent leakage of oil therefrom when the spin-on oil filter is attached to the adapter.

A further object is to provide an improved oil filter adapter that is simple and easy to use.

A still further object is to provide an improved oil filter adapter that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 a perspective view of the instant invention installed on an industrial engine.

FIG. 2 is an enlarged perspective view of the instant invention with parts broken away as indicated by arrow 2 in FIG. 1.

FIG. 3 is a top view with parts broken away as indicated by arrow 3 in FIG. 2.

FIG. 4 is a side view taken with parts broken away and in section as indicated by arrow 4 in FIG. 2.

FIG. 5 is a top view of a modification.

FIG. 6 is a front view taken in direction of arrow 6 in FIG. 5.

FIG. 7 is an enlarged detail view as indicated by arrow 7 in FIG. 6.

FIG. 8 is a cross section view taken along line 8—8 in FIG. 7.

FIG. 9A is an elevational view of a modified outlet fitting.

FIG. 9B is a top view taken in direction of arrow 9B in FIG. 9A.

FIG. 9C is a bottom view taken in direction of arrow 9C in FIG. 9A.

FIG. 10A is an elevational view of a modified inlet fitting.

FIG. 10B is a top view taken in direction of arrow 10B in FIG. 10A.

FIG. 10C is a bottom view taken in direction of arrow 10C in FIG. 10A.

DETAILED DESCRIPTION OF THE PREFERRED EMBODIMENTS

Turning now descriptively to the drawings, in which similar reference characters denote similar elements throughout the several views, FIGS. 1 through 4 illustrate an improved oil filter adapter 10 mounted on an engine block 12 of an industrial gas engine 14 so as to allow the replacement of an industrial type oil filter with a standard spin-on type motor vehicle oil filter 16. The adapter 10 consists of a bracket 18 having a generally horizontal plate 20 with a seat 22 formed on the underside and a generally vertical flange 24 with a pair of spaced apart mounting holes 26 therethrough. A bolt 28 extends through each of the mounting holes 26 in the flange 24 of the bracket 18 and into the engine block 12 of the industrial gas engine 14.

An inlet fitting 30 is affixed into the plate 20 of the bracket 18 and extends therethrough so that an inlet hose 32 from the lubrication system of an industrial gas engine 14 can be attached thereto. An outlet fitting 34 having a restriction orifice 35 is affixed onto the plate 20 of the bracket 18 and extends therethrough so that an outlet hose 36 from the lubrication system of the industrial gas engine 14 can be attached thereto. The outlet fitting 34 further has a threaded lower cylindrical mounting portion 38 extending from the underside of the plate 20 of the bracket 18. Threaded lower cylindrical mounting portion 38 threadably engages with the threaded aperture 40 in the standard spin-on type motor vehicle oil filter 16 to bear against the seat 22 on the underside of the plate 20 of the bracket 18, thereby integrating the standard spin-on type motor vehicle oil filter 16 into the lubrication system of the industrial gas engine 14.

As shown in FIGS. 5 through 8, a mechanism 42 is provided for self sealing the threaded lower cylindrical mounting portion 38 of the outlet fitting 34 with the threaded aperture 40 in the standard spin-on type motor vehicle oil filter 16 to prevent leakage of oil therefrom when the standard spin-on type motor vehicle oil filter 16 is integrated into the lubrication system of the industrial gas engine 14.

The self sealing mechanism 42 includes a spring 44 having a tapered top end to be retained to the upper segment of the threaded lower cylindrical mounting portion 38 of the outlet fitting 34. A retainer 46 includes a sleeve 48 with an annular flange 50 about its lower end. The sleeve has a pair of small bumps 52 oppositely positioned about the outer cylindrical surface thereof so that the lower end of the spring 44 can be retained on the sleeve 48, with the sleeve 48 slideable over the lower segment of the lower cylindrical threaded mounting portion 38 of the outlet fitting 34. A washer like plastic seal member 54 is secured to the annular flange 50 of the retainer 46 which will bear against the threaded aperture 40 on the standard spin-on type motor vehicle oil filter 16 to prevent the leakage of the oil therefrom.

As shown in FIGS. 9A through 9C the outlet fitting 34 can have an elongated threaded upper cylindrical portion 56 so that an internally threaded connector (not shown) on the outlet hose 36 can be attached thereto.

As shown in FIGS. 10A through 10C the inlet fitting 30 can have an elongated threaded upper cylindrical portion 58 so that an internally threaded connector (not shown) on the inlet hose 32 can be attached thereto.

LIST OF REFERENCE NUMBERS

10: improved oil filter adapter
12: engine block
14: industrial gas engine
16: standard spin-on type motor vehicle oil filter
18: bracket
20: generally horizontal plate of 18
22: seat on 20
24: generally vertical flange of 18
26: mounting hole in 24
28: bolt
30: inlet fitting
32: inlet hose
34: outlet fitting
35: restriction orifice in 34
36: outlet hose
38: threaded lower cylindrical mounting portion of 34
40: threaded aperture in 16
42: self sealing mechanism
44: spring
46: retainer
48: sleeve on 46
50: annular flange on 46
52: small bump
54: washer like plastic seal member
56: elongated threaded upper cylindrical portion of 34
58: elongated threaded upper cylindrical portion of 30.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An oil filter adapter mounted on an engine block of an industrial gas engine so as to allow the replacement of an industrial type oil filter with a standard spin-on type motor vehicle oil filter, said adapter comprising a) a bracket having a generally horizontal plate with a seat formed on the underside and a generally vertical flange with a pair of spaced apart mounting holes therethrough, b) a pair of bolts, each extending through one of the mounting holes in the flange of said bracket and into the engine block of the industrial gas engine, c) an inlet fitting affixed onto the plate of said bracket and extending therethrough and connected to an inlet hose from the lubrication system of the industrial gas engine, d) an outlet fitting having a restriction orifice affixed onto the plate of said bracket and extending therethrough and connected to an outlet hose from the lubrication system of the industrial gas engine, and said outlet fitting further having a threaded lower cylindrical mounting portion extending from the underside of the plate of said bracket threadably connected with the threaded aperture in the standard spin-on type motor vehicle oil filter to allow the oil filter to bear against the seat on the underside of the plate of said bracket thereby integrating the standard spin-on type motor vehicle oil filter into the lubrication system of the industrial gas engine, wherein the improvement comprises means for self sealing said threaded lower cylindrical mounting portion of said outlet fitting with the threaded aperture on the standard spin-on type motor vehicle oil filter to prevent leakage of oil therefrom when the standard spin-on type motor vehicle oil filter is integrated into the lubrication system of the industrial gas engine, said sealing means including:

a) a spring coaxially arranged about said threaded lower cylindrical mounting portion and having a tapered top end retained to the upper segment of said threaded lower cylindrical mounting portion of said outlet fitting;

b) a retainer being a sleeve with an annular flange about its lower end, the sleeve having a pair of small bumps oppositely positioned on an outer cylindrical surface thereof so that the lower end of said spring can be retained on the sleeve with the sleeve slidable over the lower segment of said lower cylindrical threaded mounting portion of said outlet fitting; and c) a washer like plastic seal member secured to the annular flange of said retainer bearing against the threaded aperture on the standard spin-on type motor vehicle oil filter to prevent the leakage of oil therefrom.

2. An improved oil filter adapter as recited in claim 1, further including:

a) said outlet fitting having an elongated threaded upper cylindrical portion so that an internally threaded connector on the outlet hose can be attached thereto; and b) said inlet fitting having an elongated threaded upper cylindrical portion so that an internally threaded connector on the inlet hose can be attached thereto.

* * * * *